United States Patent
Haarer (10) Patent No.: US 7,819,603 B1
(45) Date of Patent: Oct. 26, 2010

(54) SNAP-TOGETHER DESIGN FOR COMPONENT ASSEMBLY

(75) Inventor: Steven R. Haarer, Whitesville, KY (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 565 days.

(21) Appl. No.: 11/382,089

(22) Filed: May 8, 2006

Related U.S. Application Data (60) Provisional application No. 60/679,956, filed on May 11, 2005.

(51) Int. Cl.
 *F16B 21/00* (2006.01)
 *A44B 17/00* (2006.01)
(52) U.S. Cl. .......................... 403/329; 24/586.1; 24/563
(58) Field of Classification Search ................. 403/329; 24/584.1, 586.1, 586.11, 653, DIG. 43; 312/111, 312/140
 See application file for complete search history.

(56) References Cited

U.S. PATENT DOCUMENTS

| 4,012,155 A | * | 3/1977 | Morris ........................ 403/290 |
| 6,058,577 A | * | 5/2000 | Ida et al. ..................... 24/697.1 |
| 6,536,503 B1 | | 3/2003 | Anderson et al. |

* cited by examiner

*Primary Examiner*—Victor MacArthur
(74) *Attorney, Agent, or Firm*—Theresa Fritz Camoriano; Guillermo Camoriano; Camoriano and Associates

(57) ABSTRACT

A snap-together assembly mechanism includes a first body having a projection defining a reduced diameter portion and a shoulder. The assembly mechanism also includes a second body defining a trough which receives the projection, the trough including a web spanning the sides of the trough, wherein as the pin enters between the web and the trough, it momentarily stretches the web until the shoulder passes the web, wherein the web snaps back once it is aligned with the reduced diameter portion of the projection.

6 Claims, 7 Drawing Sheets

SNAP-TOGETHER DESIGN FOR COMPONENT ASSEMBLY

BACKGROUND OF THE INVENTION

This application claims priority from U.S. Provisional Application Ser. No. 60/679,956 filed May 11, 2005, which is hereby incorporated herein by reference.

The present invention relates to a mechanism which allows components to snap together for assembly. More particularly, it relates to a snap-together design wherein one or more projections on one component engage one or more webs on a second component to secure the two components together.

In many areas of manufacturing, there is often a need to secure two or more components during assembly. Often, these components are screwed or bolted together. Alternatively, the components may be secured together by other means such as gluing, welding, or riveting.

SUMMARY OF THE INVENTION

The present invention provides a mechanism which aids in aligning components for assembly and which quickly and securely holds components together. The components simply snap together without the need for any tools. The connection is instantly ready, without the need to rotate screws or bolts or to wait for glues to dry or for welds to cool off.

In an embodiment of the snap-together mechanism made in accordance with the present invention, a pin projects from a first component and has a head at its first end, a reduced diameter portion between the head and the component, and a flat shoulder at the intersection of the head and the reduced diameter portion. The reduced diameter portion has a "D" shaped cross section. The pin is received by a second component and is retained by the second component in order to secure the first and second components together.

In a preferred embodiment, the second component defines an open trough, and the trough has a "bridge" or web at one end, spanning the two sides of the trough. The trough has a U-shaped profile which, when spanned by the web, forms a "D"-shaped profile that closely matches the profile of the reduced diameter portion of the pin. The bridge is relatively flexible in a direction which is axially perpendicular to the longitudinal axis of the pin, such that it flexes momentarily to allow the end of the pin to enter between the trough and the web. Then the bridge snaps back to its relaxed position behind the shoulder of the pin to retain the pin on the second component.

DESCRIPTION OF PREFERRED EMBODIMENTS

Figure 1:
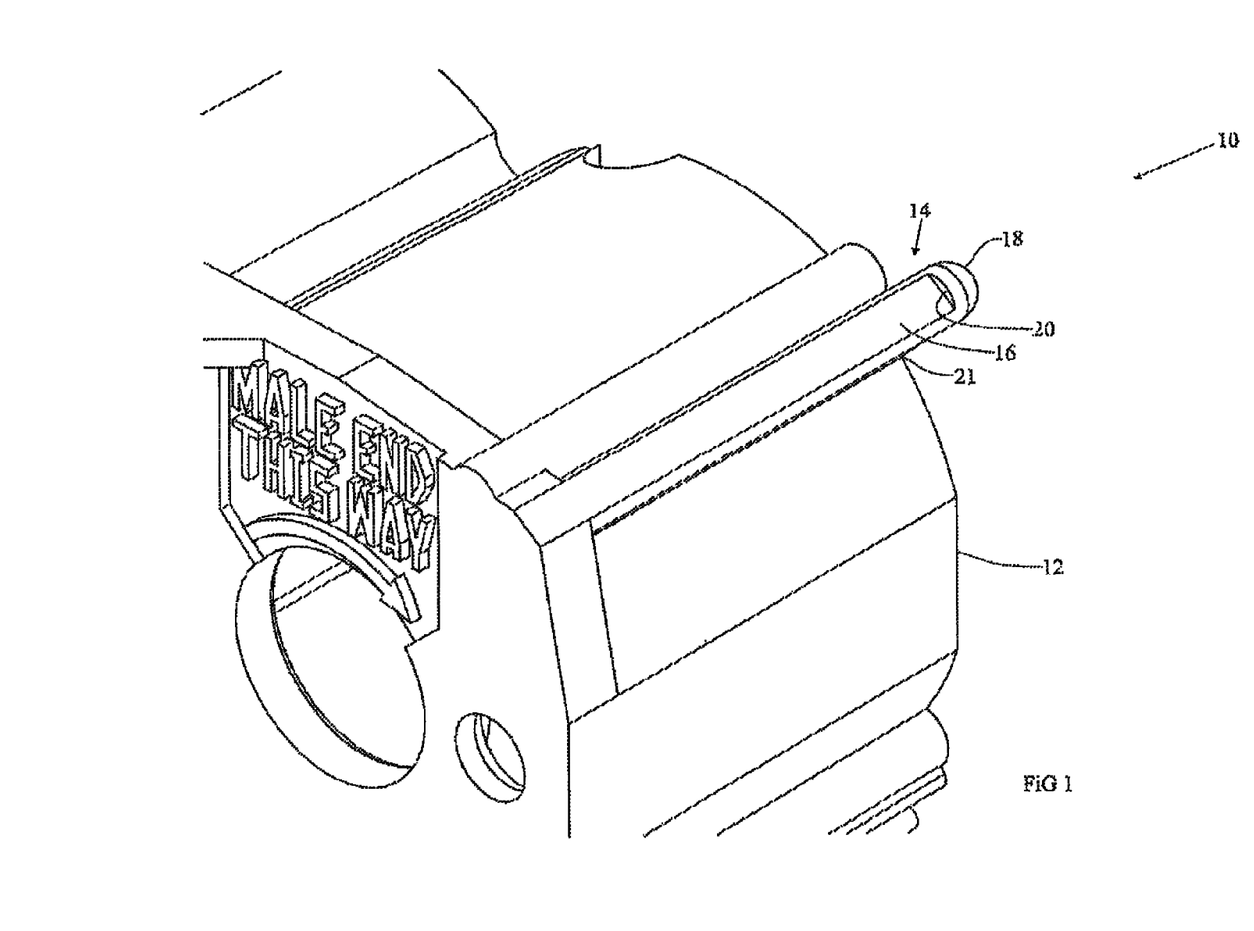
FIG. 1 is a broken away, perspective view of a first body including a male part of a snap-together assembly mechanism made in accordance with the present invention.
Figure 2:
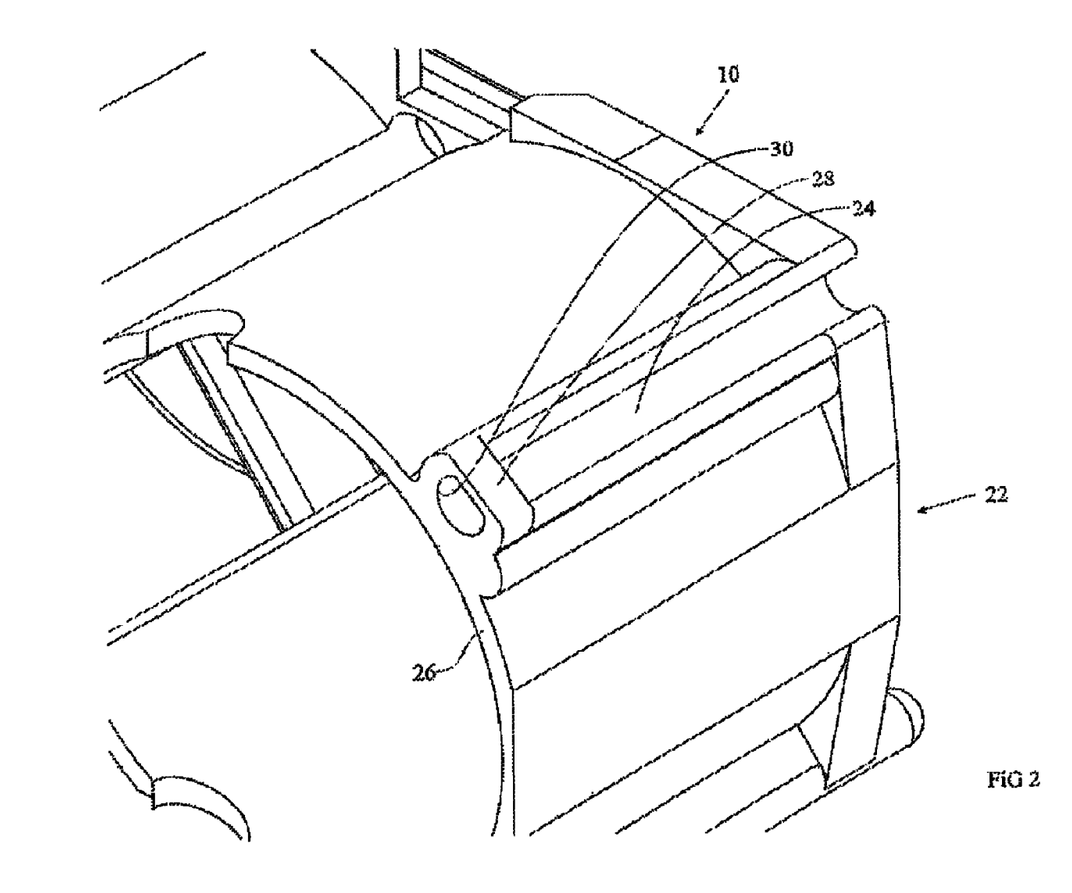
FIG. 2 is a broken away, perspective view of a second body including a female part of a snap-together assembly mechanism made in accordance with the present invention.
Figure 3:
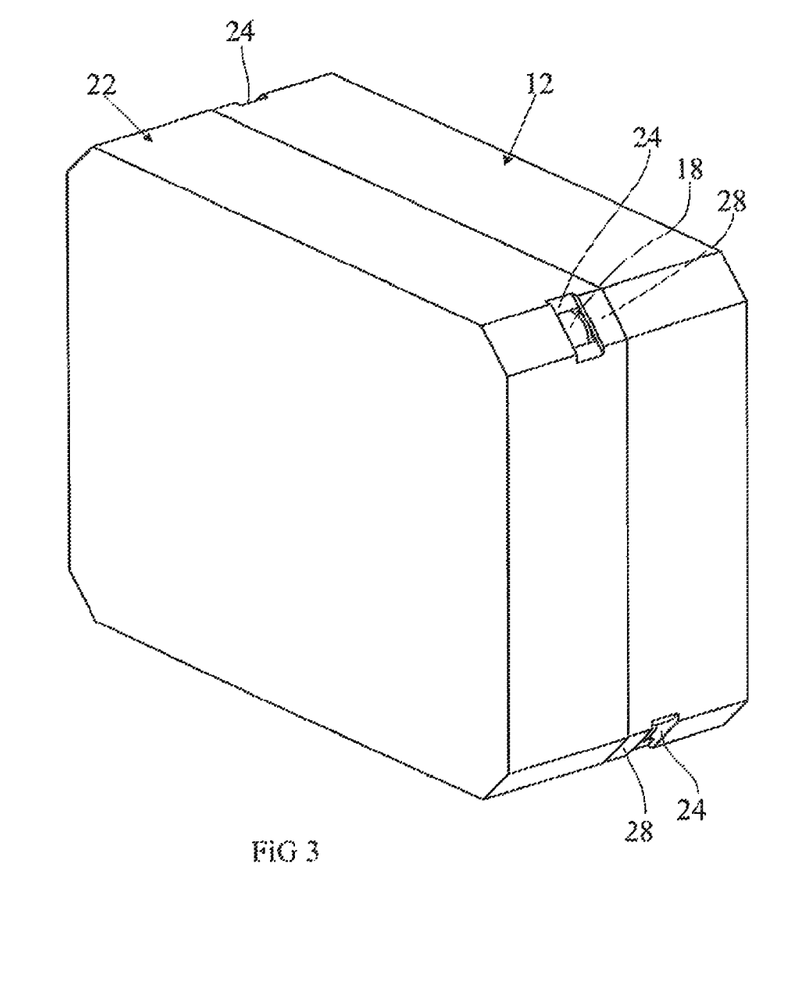
FIG. 3 is a perspective view of generic first and second bodies, each of which incorporates both the male and female parts of FIGS. 1 and 2.

FIGS. 1 and 2 depict a first example, and FIGS. 3-15 depict a second example of the use of a snap-together mechanism 10 made in accordance with the present invention. The difference between the embodiment of FIGS. 1 and 2 and the embodiment of FIGS. 3-15 is that FIGS. 1 and 2 have the snap-together mechanism on hollow housing bodies, while FIGS. 3-15 have the snap-together mechanism on two generic blocks.

Figure 8:
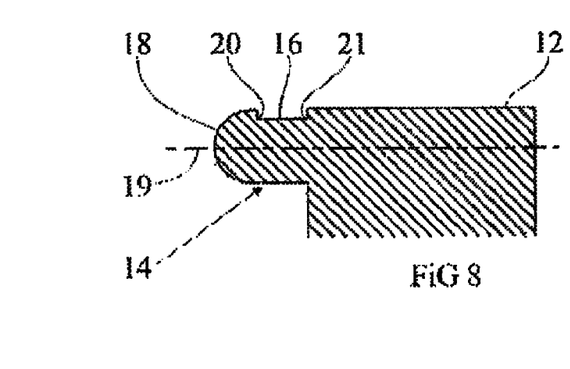
FIG. 8 is a view along line 8-8 of FIG. 5.
Figure 9:
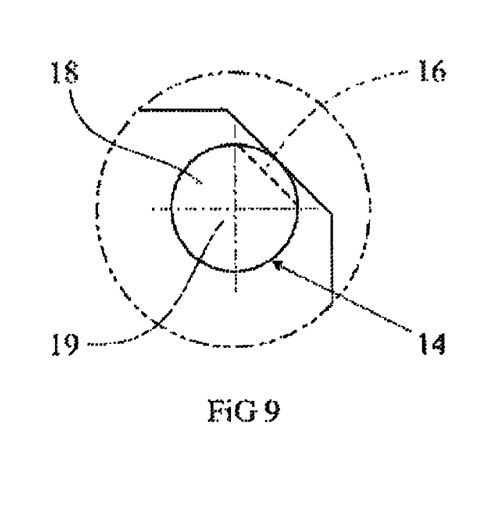
FIG. 9 is an enlarged view of detail 9 of FIG. 5.
Figure 10:
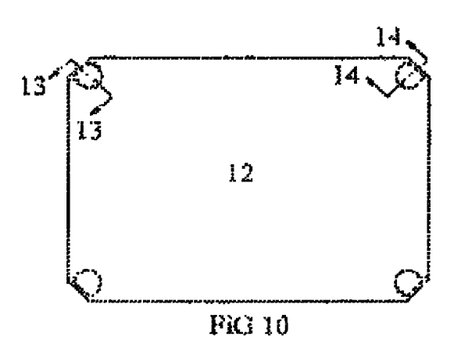
FIG. 10 is a front view of the assembly of FIG. 3.
Figure 11:
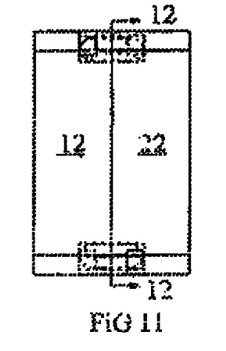
FIG. 11 is a side view of the assembly of FIG. 3.
Figure 12:
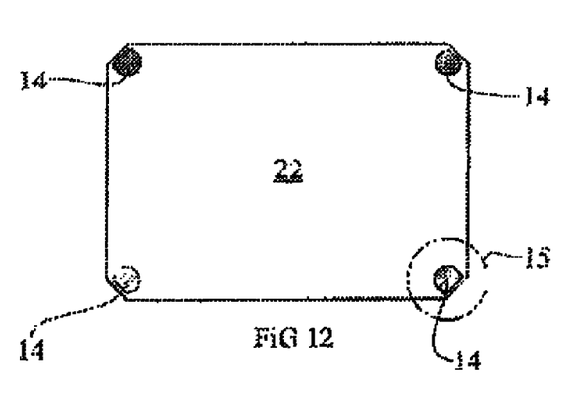
FIG. 12 is a view taken along the line 12-12 of FIG. 11.
Figure 13:
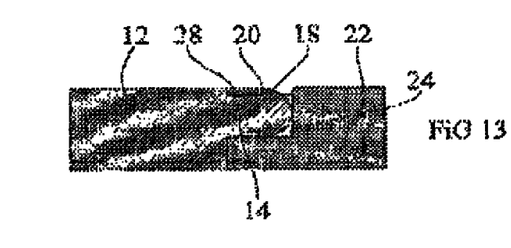
FIG. 13 is a view taken along the line 13-13 of FIG. 10.
Figure 14:
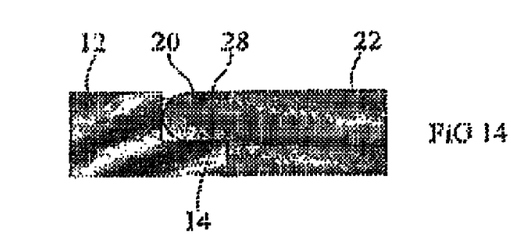
FIG. 14 is a view taken along the line 14-14 of FIG. 10.
Figure 15:
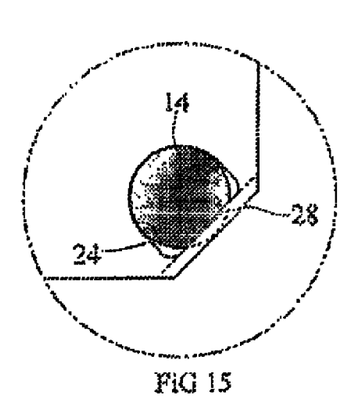
FIG. 15 is an enlarged view of the detail 15 of FIG. 12.

Referring to FIGS. 1, 8, and 9, the front housing or first body 12 includes a locating pin or male projection 14, which has a first end that projects outwardly beyond the housing 12 and a second end 21 secured to the housing 12. The pin 14 is a generally cylindrical element having a longitudinal axis 19. The head 18 of the pin 14 has a circular cross-section symmetrical about the longitudinal axis 19 and is tapered at its first end to facilitate its insertion into the corresponding female part of the second body 22. In a section of the pin 14 between the head 18 and the second end 21, a portion of the circular cross-section of the pin 14 is removed to form a flat surface or landing 16 extending parallel to the longitudinal axis 19 and giving the pin 14 a "D"-shaped profile in that area. The intersection between the landing 16 and the circular cross-section head portion 18 of the pin 14 defines a flat shoulder 20, which is perpendicular to the landing and to the longitudinal axis 19. In this particular embodiment, the head 18 is substantially hemispherical.

Figure 6:
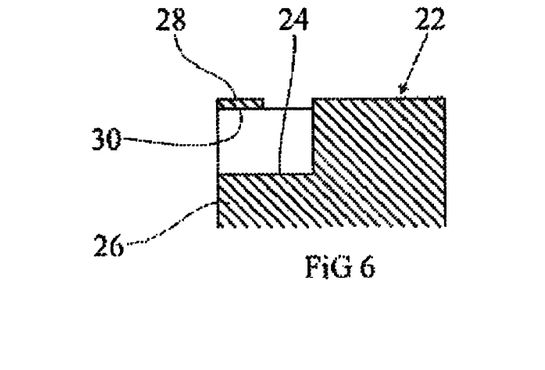
FIG. 6 is a view along line 6-6 of FIG. 5.
Figure 7:
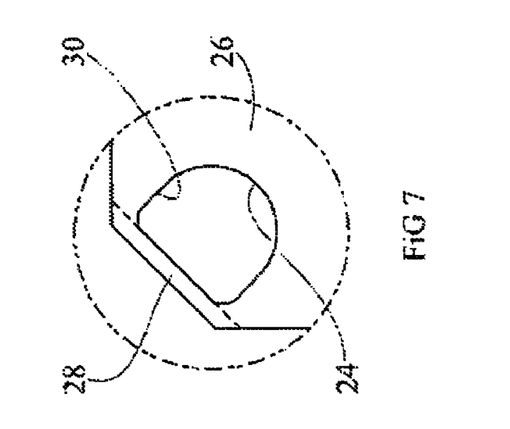
FIG. 7 is an enlarged view of detail 7 of FIG. 5.

Referring to FIGS. 2, 6, and 7, the rear housing or second body 22 defines an open trough 24 having a U-shaped cross-section with two sides or legs and defining an open top between the two sides, as shown in FIG. 7. The trough 24 also defines openings at both its front and rear ends. At the front end 26 of the trough 24, a bridge or web 28 extends across the trough 24, spanning the two sides and closing off the open top of the "U" to form a "D"-shaped profile front opening 30, which matches very closely with the "D" shaped profile of the reduced diameter portion of the locating pin 14.

During assembly of the parts 12, 22 the head 18 of the pin 14 is inserted between the web 28 and the trough 24. The head 18 of the pin 14 is larger than the space between the web 28 and the trough 24, so the web 28 (which is relatively flexible in a direction which is axially perpendicular to the longitudinal axis 19 of the pin 14) momentarily stretches to allow the head 18 to squeeze through. Once the head 18 is past the web 28, the web 28 snaps back to its relaxed position, where the D-shaped opening defined by the web 28 and the trough 24 receives the D-shaped portion of the pin 14 with a close fit. The shoulder 20 on the pin 14 then abuts or is adjacent to the web 28 (which is relatively inflexible in a direction which is parallel to the longitudinal axis 19 of the pin 14), preventing the pin 14 from pulling back out of the trough 24. The taper at the end of the head 18 helps it enter the space between the web 28 and the trough 24 and serves as a wedge that helps deform the web 28 as the pin 14 is pushed into the trough 24.

In a preferred embodiment, the web 28 is made from a relatively flexible material, such as polypropylene or nylon. In this embodiment, the web 28 has a dimension of approximately 0.020" in a direction perpendicular to the longitudinal axis (thickness of the web) and approximately 0.100" in a direction parallel to the longitudinal axis (width of the web). This makes the web 28 more easily expandable perpendicular to the longitudinal axis than parallel to the longitudinal axis. It is preferred that the dimension of the web parallel to the direction of the longitudinal axis be at least three times the dimension of the web perpendicular to the longitudinal axis and more preferable that it be at least four times that dimension. The pin 14 may be made from any number of materials, including metal and plastic. In this embodiment, the pin is between 0.080" and 0.100" in diameter.

Even though FIG. 1 shows a pin 14 with a landing 16 which extends well beyond the point where the pin 14 connects to the body 12, that is not necessary. The landing 16 only needs to be as long as the width of the web 28 in order to provide a reduced diameter section of the pin to fit between the web 28 and the trough 24. The landing 16 also may extend a bit farther in order to make it easy for a tool, such as the end of a flat screwdriver (not shown) to be inserted under the web 28 and to pry between the web 28 and the landing 16 to provide enough clearance for the head 18 to be pulled back through the web 28 to disassemble the parts 12, 22.

Once the parts 12, 22 are assembled, the force acting on the web 28 to try to pull the parts apart is substantially a linear force which acts axially parallel to the longitudinal axis 19 of the pin 14 (which, as indicated above, is the direction in which the web 28 is relatively inflexible). As the parts 12, 22 are pulled apart, this linear force is transmitted from the pin 14 to the web 28 via the shoulder 20 which abuts the web 28. There is very little, if any, radial force acting on the web 28 to force the web 28 to stretch perpendicular to the axis of the pin 14 (in its relatively flexible direction) and release the parts 12, 22. If the ability to disassemble the parts 12, 22 is of interest, the web 28 could be designed to allow for easy removal when desired. For instance, one end of the web 28 could be hinged at one side of the trough 24, with the other end of the web 28 free to swing away (similar to a drawbridge over a moat) when desired. The free end of the web 28 could hook or snap onto the other side of the trough 24 for quick "snap" assembly of the parts 12, 22, and to prevent the unintended disassembly of the parts 12, 22. Likewise, the web 28 could be split in the middle or at either of its ends.

Figure 4:
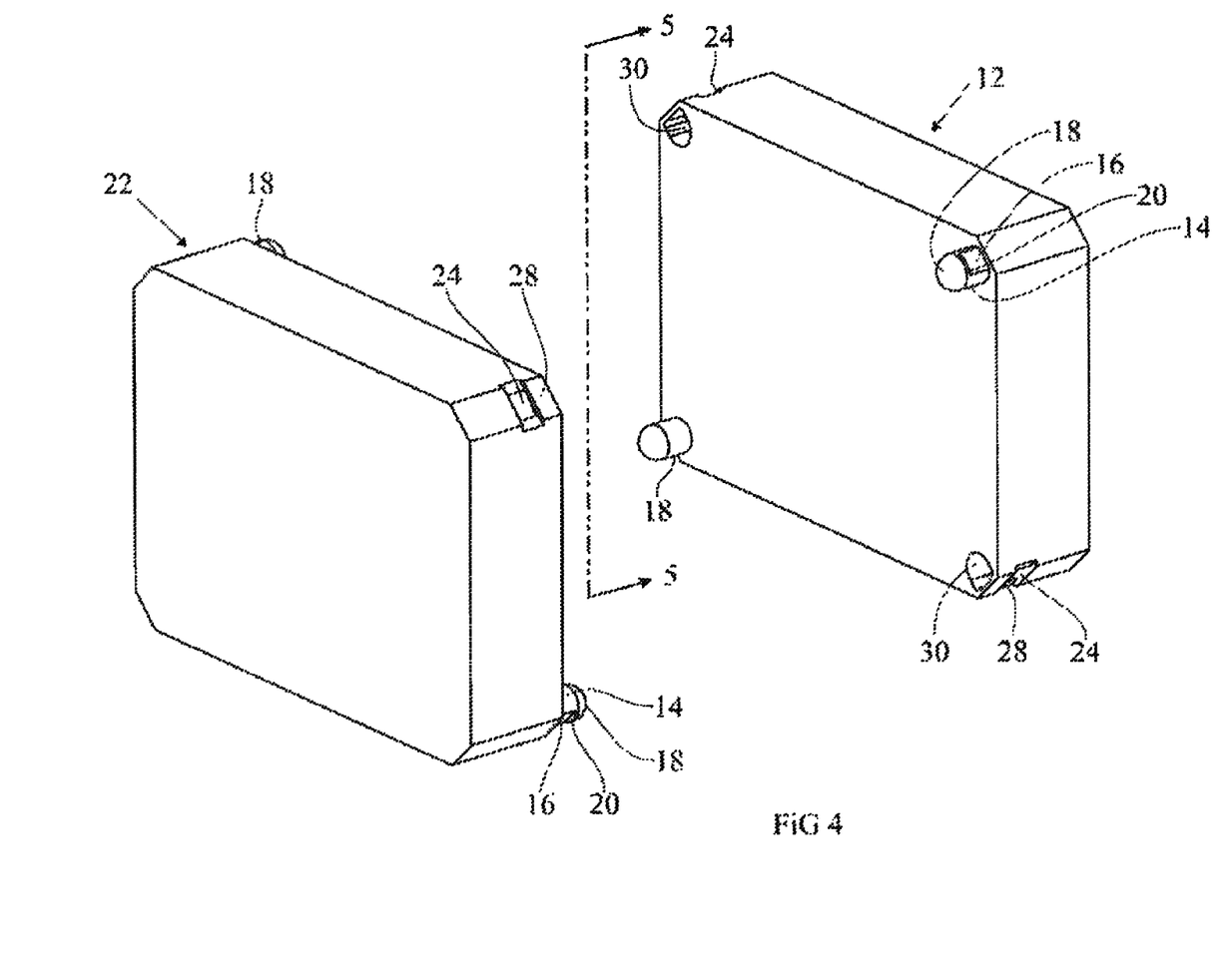
FIG. 4 is an exploded perspective view of the bodies of FIG. 3.
Figure 5:
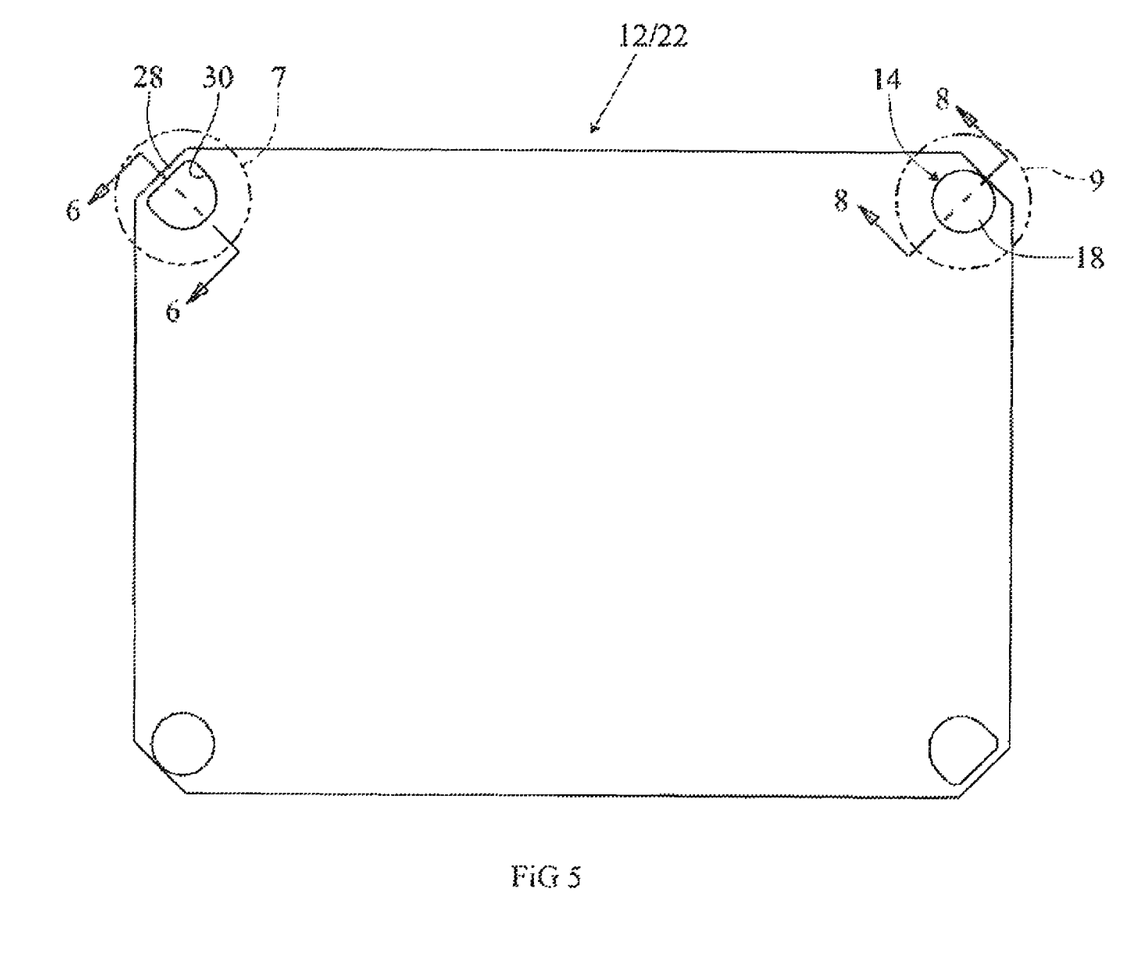
FIG. 5 is a front view of the second body of FIGS. 3 and 4.

FIGS. 10-15 show the two parts 12, 22 assembled together. It can be appreciated, especially as illustrated in FIG. 4, that there are actually two pins 14 projecting forwardly from the first body 12 (and diametrically opposed to each other), and two pins 14 projecting rearwardly from the second body 22 (also diametrically opposed to each other). Each of the bodies 12, 22 also has corresponding troughs 24 (also diametrically opposed to each other) to receive the corresponding pins 14. This arrangement is particularly useful as the part 12 can thus be manufactured to be identical to the part 22, such that only one such part 12 or 22 needs to be designed and made. Since part 12 is identical to part 22, then two of these parts 12 or 22 can be fastened together simply by flipping one of them over such that the pins 14 of one part 12 or 22 are cooperatively aligned with the corresponding troughs 24 of the other part 12 or 22.

In the event that there is only one of these snap-together mechanisms between the first and second bodies, with only one pin 14 projecting from the first body and one trough 24 in the second body, then disassembly of the two bodies can be achieved by rotating the bodies relative to each other so that the flat landing 16 of the pin 14 is directed away from the web 28. Then there is no shoulder 20 abutting the web 28 to prevent the pin 14 from being pulled out of the trough 24, so the pin 14 can simply be pulled out through the space between the web 28 and the trough 24. In such a situation, it may then be desirable to provide some other mechanism to prevent the two assembled bodies from inadvertently rotating relative to each other.

While the pins 14 in the embodiments described above have a substantially cylindrical cross-section (except in the landing 16 area where they have a substantially "D" shaped cross-section), this should not be construed as a limitation. The pin 14 could have a triangular profile, for instance, and the profile in the landing area could be trapezoidal. The web 28 flexes readily in one axis (radially relative to the longitudinal axis of the pin 14) both due to the construction of the web 28 and due to the geometry of the head 18 of the pin 14. The web 28 is also made to resist flexing in the axis which is parallel to the longitudinal axis of the pin 14. Therefore, in the absence of a pin 14 geometry to pry the web 24 in its flexible direction when attempting to disassemble the parts, the strong axis of the web 24 comes into play to resist this disassembly.

Figure 16:
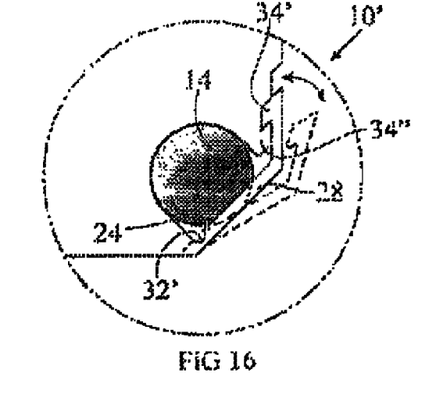
FIG. 16 is an enlarged view, similar to that of FIG. 15, but for another embodiment of a snap-together assembly mechanism made in accordance with the present invention.

FIG. 16 depicts another embodiment of a snap-together assembly mechanism 10' made in accordance with the present invention. In this instance, the web 28' includes a hooked portion 34' at one end of the web 28' and a thinned out portion 32' at the other end of the web 28', and the hooked portion 34' of the web 28' is received by a hooked portion 28" on the body. When the hooked portion 34' of the web 28' is disengaged from the corresponding hooked portion 28" on the body, the thinned out portion 32' acts as a living hinge to allow the web 28' to be swung out of the way (as shown in phantom) in order to more readily remove the pin 14 from the trough 24'. This FIG. 16 depicts just one example in which the web 34' is releasably secured to at least one of the two sides of the trough 24'.

It will be obvious to those skilled in the art that modifications may be made to the embodiments described above without departing from the scope of the present invention.

What is claimed is:

1. A snap-together assembly mechanism, comprising:
a first body;
a projection extending from said first body, said projection having a first end and a second end, and defining a longitudinal axis extending from said first end to said second end, and wherein the second end is secured to said first body;
said projection having a head at said first end and defining a reduced cross-section portion between said head and said second end, said reduced cross-section portion having a first end closest to the first end of said projection, said projection further defining a shoulder at the first end of said reduced cross-section portion, said shoulder having a larger cross-section than said reduced cross-section portion;
a second body having a surface defining an elongated open trough having a U-shaped cross-section which defines a bottom and two sides, and an open top between the two sides, said trough also having first and second longitudinal ends, at least said first longitudinal end being open;
a web secured to said two sides of said trough and enclosing a first portion of the open top of said trough from one of said two sides to the other of said two sides at the first end of said trough, said web having a first end adjacent to the first end of the trough and a second end opposite the first end;

wherein said projection on said first body is sized and arranged so that, when the head of said projection is inserted longitudinally into the open first end of said trough, entering between the first end of said web and said trough, said projection causes said web to expand, until said shoulder clears the second end of said web, and, once the shoulder clears the web, the web is received in the reduced cross-section portion of the projection with the shoulder lying adjacent to the second end of the web; and wherein said web is releasably secured to at least one of said two sides of said trough.

2. A snap-together assembly mechanism as recited in claim 1, wherein said web is more readily expanded in a direction generally perpendicular to said longitudinal axis of said projection than in a direction generally parallel to said longitudinal axis of said projection.

3. A snap-together assembly mechanism as recited in claim 2, wherein the dimension of said web in said generally parallel direction is greater than the dimension of said web in said generally perpendicular direction.

4. A snap-together assembly mechanism as recited in claim 3, wherein the dimension of said web in said generally parallel direction is at least four times greater than the dimension of said web in said generally perpendicular direction.

5. A snap-together assembly mechanism as recited in claim 3, wherein said first end of said projection defines a tapered outer surface which functions as a wedge to stretch said web in the perpendicular direction as the projection is inserted in the direction of its longitudinal axis into said trough.

6. A snap-together assembly mechanism as recited in claim 1, wherein said web is hinged to one of said sides of said trough and is releasably secured to the other of said sides of said trough.

* * * * *